April 25, 1950 — L. J. M. TEEPE — 2,505,371
PLANT FOR TREATING OBJECTS IN A LIQUID
Filed Feb. 6, 1947
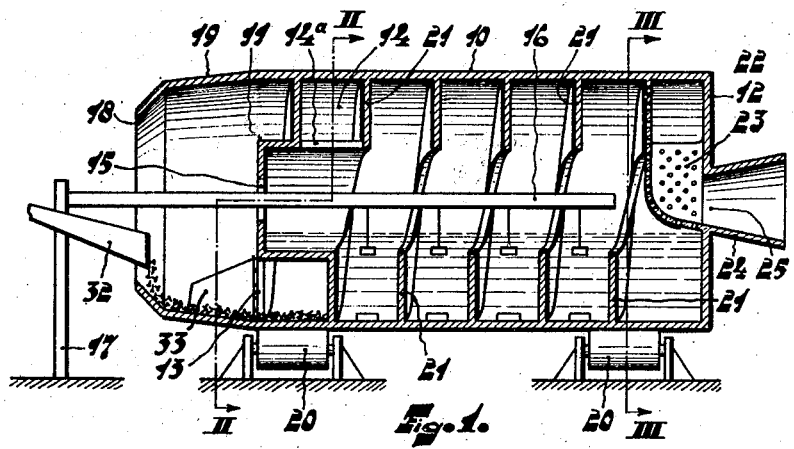
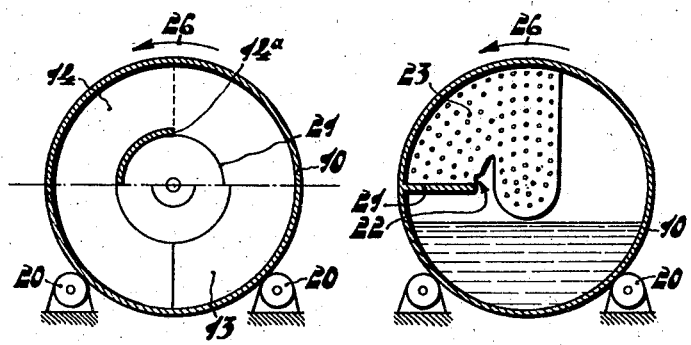
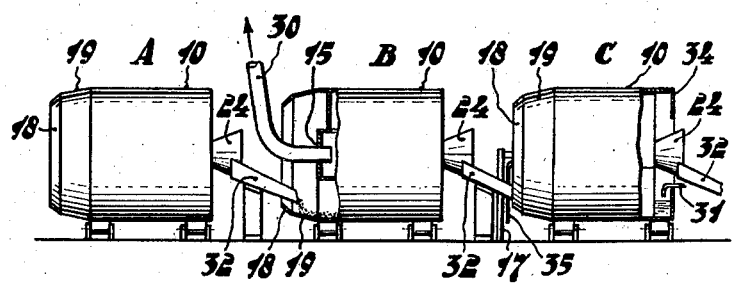
L. J. M. TEEPE
INVENTOR
AGENT Patented Apr. 25, 1950

2,505,371

UNITED STATES PATENT OFFICE 2,505,371

PLANT FOR TREATING OBJECTS IN A LIQUID

Laurens Johannes Marie Teepe, Eerbeek, Netherlands, assignor to Hartford National Bank and Trust Company, Hartford, Conn., as trustee Application February 6, 1947, Serial No. 726,763
In the Netherlands July 15, 1944

Section 1, Public Law 690, August 8, 1946
Patent expires July 15, 1964

3 Claims. (Cl. 51—164)

This invention relates to a plant for treating solid objects in a liquid bath, which plant consists of at least one rotary drum which is filled with liquid and which is furnished with an opening for the introduction of the objects. Known plants of this kind comprise drums which are substantially cylindrical and which can rotate about a horizontal shaft. In the centre of one of the end surfaces of the drum there is recessed an aperture through which the objects may be introduced into the liquid bath in the drum. In the case of galvanic baths there is, in addition, one of the electrodes which is led into the interior of the drum through the said aperture. As a rule, the latter will therefore have to be sufficiently large to permit not only the passage of the electrode carrier but also the introduction of the objects to be treated with the aid of a chute or a shovel. A large aperture, however, implies with a given diameter of the drum a low level of the liquid in this drum and hence a small volume of the liquid bath since, as a rule, this aperture is not shut off and therefore invariably has to keep above the level of the liquid when the drum is rotating.

According to the present invention the aperture for the introduction of the objects is provided in such manner as to be located periodically below the level of the liquid during the rotation. To this aperture adjoins a channel which has such a shape that during the rotation of the drum at least one cross-section of this channel invariably lies entirely above the level of the liquid in the drum.

The channel adjoining the inlet aperture of the drum prevents the liquid from flowing out of the drum in spite of the fact that the aperture periodically comes below the level of the liquid. Although the said channel is then partly filled with liquid, at least one cross-section is invariably located above the liquid level, so that the liquid cannot fill the channel throughout its length and, consequently, cannot flow through this channel directly to the exterior. The channel is provided relatively to the direction of rotation of the drum in such manner that the liquid which periodically fills a portion of the channel always returns again to the interior of the drum during the rotation of the latter.

The above-described construction affords the additional advantage that drums with an inlet aperture thus provided may be placed one after another, so that the final product originating from the preceding drum may be shot in front of a similar aperture in the second drum and subsequently taken up in the latter, etc. Since the inlet aperture of a drum periodically comes below the level of the liquid, this aperture may thus periodically be located at lower level than the outlet aperture of the preceding drum, so that the objects originating from the preceding drum, which is at the same level, may get into the next drum by simply shooting them into the latter. This implies that the introduction of the objects into the drum and their removal after treatment with the aid of a shovel may be dispensed with.

In order that the invention may be more clearly understood and readily carried into effect, it will be described more fully with reference to the accompanying drawing.

Fig. 1 shows a plant according to the invention in longitudinal section.

Figs. 2 and 3 are cross-sectional views of this plant at different points.

Fig. 4 shows a plant constituted by three drums placed one after another.

In Figs. 1, 2 and 3, reference numeral 10 denotes the cylindrical housing of a drum, of which 11 and 12 are the end surfaces. The end surface 11 is provided with two apertures, viz. an aperture 13 for the introduction of the objects into the drum and an aperture 15 for the passage of the anode carrier 16, which is supported outside the drum on a fixed stand 17. The aperture 15 lies in the centre of the circular end surface 11 and is permanently located above the level of the liquid in the drum. The aperture 13 is eccentrically provided in the said terminal surface, adjoining the outer wall 10 of the drum and during the rotation of the latter thus periodically comes below the level of the liquid. On the inside against the terminal surface 11 a channel 14 having a semi-circular centre line adjoins the aperture 13. When the opening 14a comes below the liquid level, a portion of the channel 14, insofar as it lies also below the liquid level, is also filled with liquid. However, since this channel has a semi circular longitudinal axis, the channel will never be located completely below the liquid level, so that it is always possible to indicate a cross-section of the channel which is above the liquid level. Consequently the liquid flowing out of the drum will never reach the outlet aperture 13 of the channel, so that it will never be possible that liquid flows away from the drum through the channel 14. The liquid which periodically flows into the channel 14 upon rotation of the drum in the direction of the arrow 26 of Fig. 3 is led back through the aperture 14a to the interior of the drum. A drum comprising such a channel is therefore serviceable only in a definite direction of rotation, which is indicated by the arrow 26 in the executional example shown. The inlet channel 14 is provided on the inside of the terminal surface 11. This channel 14 empties at one end into the interior of the drum which also contains the liquid bath and at the other end into a chamber having a slightly conical wall 19 in which a central aperture 18 is provided. The objects to be treated are thrown into the space surrounded by the conical wall 19 either by means of a shovel, or by means of a chute 32 and during the rotation of the drum are moving in this space to the inlet 13 of the channel 14. Beside this inlet there is arranged an adjustable partition 33, the angle enclosed between this partition and the axis of the channel 14 being variable by turning the partition. The number of the objects falling against this partition 33 at each revolution and thus introduced into the channel 14 may thus be varied within broad limits. The number of objects present inside the wall 19 may serve as a bumper quantity in case of a regular introduction into the drum and an irregular supply through the aperture 18. Rotation of the drum has the effect that the objects slide through the channel 14 and fall at last through the aperture 14a into the liquid bath. On further motion of the drum the objects are steadily led further to the right by the helical ridge 21 placed inside the drum. At last, the objects are received in the channel 22, which is constituted by a portion of the last turn of the ridge 21 and the terminal surface 12 of the drum. The last portion of this channel has a greatly perforated wall 23, so that the liquid can flow through the wall back into the bath and the objects are periodically lifted out of the bath. These objects are pushed on the channel 22, at last leaving the drum through an aperture 25 to reach a funnel-shaped channel 24. The latter serves solely for guiding the objects to chutes or containers located outside the drum.

If the drum is used as a galvanising bath, it comprises in addition to the anode wire 16 described before, a certain number of contact bodies with which the objects to be treated successively come into contact. If the drum is, however, only intended as a chemical bath, for example for cleaning, for extracting the grease, or for etching, the anode and the cathodes are superfluous.

The drum is rotatably arranged on a certain number of rollers 20 and is driven by means of these rollers at the desired speed with the aid of an electric motor in the direction indicated by the arrow 26.

Figure 4 shows diagrammatically a plant for the treatment of objects in various liquid baths. This plant is constituted by three drums placed one after another, of the construction described with reference to Figures 1, 2 and 3.

The objects to be treated in the first drum A are thrown into the interior through the aperture 18 with the aid of a shovel and subsequently traverse the drum in the above-described manner, the objects being thrown out again through the funnel 24. The latter empties above a chute 32, by which the objects treated in the first drum are guided directly to the second drum B in which they are transported in the same manner. This drum comprises a suction line 30 for removing any gases which may be degaged in this drum. This line is led to the interior through the aperture 15 indicated in Figure 1. From the funnel 24 of the drum B the objects fall once more in a chute 32 and thence into the galvanising drum C. Through the funnel 24 of the last-mentioned drum the objects in the treated state leave the plant and are led to a drying apparatus or a container by means of a chute 32. This drum C comprises on each terminal surface an inlet channel the operation of which is similar to that of the channel 14 described with reference to Figure 1. The channel which adjoins the aperture 18 serves to introduce the objects to be treated, whereas the channel which adjoins the opposite terminal surface serves for the periodical supply of liquid to the liquid bath. For this purpose the drum of the latter terminal surface comprises a cylindrical extension 34 above which a liquid supply line 31 empties. Through the aperture 15 is led not only the anode carrier 16 but also the discharge line 35 for the excess of liquid.

What I claim is:

1. In an apparatus for treating objects in a liquid bath of the type comprising a drum rotatable on its horizontal axis, said drum having a front and a rear wall and being partially filled with said liquid, and associated therewith a loading device for delivering said objects to said drum, in combination an arrangement for introducing said objects into the interior of said drum from said loading device which arrangement comprises a longitudinally enclosed helical channel inside said drum adjacent to said front wall, the axis of the helix of said channel coinciding with the axis of the drum and said channel being so dimensioned that invariably at least one cross section lies completely above the level of liquid in the drum, said channel adjoining an aperture in said front wall of the drum, which aperture during rotation periodically comes to lie below the liquid level and in that position becomes operative for introducing said objects into the drum.

2. In an apparatus for treating objects in a liquid bath of the type comprising a drum rotatable on its horizontal axis, said drum having a front and a rear wall and being partially filled with said liquid and associated therewith a loading device for delivering said objects to said drum, in combination an arrangement for introducing said objects into the interior of said drum from said loading device which arrangement comprises a longitudinally enclosed helical channel inside said drum adjacent to said front wall, the axis of the helix of said channel coinciding with the axis of the drum and said channel being so dimensioned that invariably at least one cross section lies completely above the level of liquid in the drum, said channel adjoining an aperture in said front wall of the drum which aperture during rotation periodically comes to lie below the liquid level and in that position becomes operative for introducing said objects into the drum, and a helical ridge in said drum arranged to form a continuation of the helical wall of said channel.

3. In an apparatus for treating objects in a liquid bath of the type comprising a drum rotatable on its horizontal axis, said drum having a front and a rear wall and being partially filled with said liquid, and associated therewith a loading device for delivering said objects to said drum, in combination an arrangement for introducing said objects into the interior of said drum from said loading device, which arrangement comprises a longitudinally enclosed helical channel inside said drum adjacent to said front wall, the axis of the helix of said channel being of such length that invariably at least one crosssection lies completely above the level of liquid in the drum, said channel adjoining an aperture in said front wall of the drum, which aperture during rotation periodically comes to lie below the liquid level and in that position becomes operative for introducing said objects into the drum, a helical ridge in said drum arranged to form a continuation of the helical wall of said channel and extending through the length of said drum, and a screen-like member at the discharge end of said ridge positioned in continuation thereof and adapted to lift said objects after treatment out of said liquid and deliver them out of said drum at the discharge end thereof.

LAURENS JOHANNES MARIE TEEPE.

REFERENCES CITED

The following references are of record in the file of this patent:

UNITED STATES PATENTS

| Number | Name | Date |
| --- | --- | --- |
| 726,763 | Greene | Jan. 25, 1927 |
| 1,647,763 | Aldeen | Nov. 1, 1927 |
| 1,831,091 | Bowers | Nov. 10, 1931 |
| 2,299,032 | Ransohoff | Oct. 13, 1942 |
| 2,323,154 | Ransohoff | June 29, 1943 |